Figure 1:
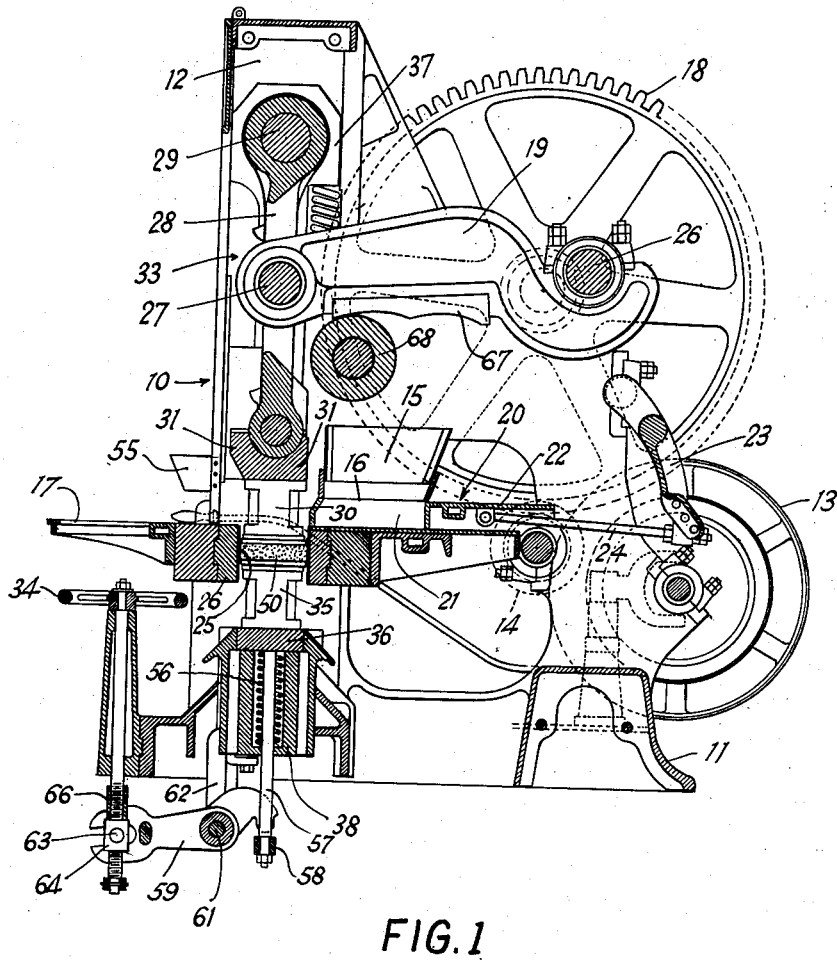

June 16, 1953  H. RIVERS  2,641,820
APPARATUS FOR MANUFACTURING BRICK
Filed Feb. 7, 1950  2 Sheets-Sheet 1

INVENTOR
Heyward Rivers
BY
ATTORNEY

June 16, 1953  H. RIVERS  2,641,820
APPARATUS FOR MANUFACTURING BRICK
Filed Feb. 7, 1950  2 Sheets-Sheet 2

INVENTOR
Heyward Rivers
BY
ATTORNEY

Patented June 16, 1953

2,641,820

UNITED STATES PATENT OFFICE 2,641,820

APPARATUS FOR MANUFACTURING BRICK

Heyward Rivers, Augusta, Ga., assignor to The Babcock & Wilcox Company, Rockleigh, N. J., a corporation of New Jersey Application February 7, 1950, Serial No. 142,785

7 Claims. (Cl. 25—103)

This invention relates to the manufacture of brick and, more particularly, to improved apparatus for assuring a uniform surface on brick manufactured by the dry press process.

In brick manufacturing apparatus of the type to which the present invention is directed, a hopper is provided to contain a supply of relatively coarse mix used to make the bricks, and which may comprise clay of a certain type or mixtures of clays with or without addition of other material. Associated with the hopper is a mold cavity for receiving a charge of mix from the hopper, and die means are operatively associated with the mold cavity, to compress the mix therein to form a brick and to eject the formed brick from the mold cavity.

The cavity is charged with mix by a charger which is reciprocable between a first position in which it receives mix from the hopper and a second position in which it discharges mix into the mold cavity. This charger, in its forward or mold cavity filling stroke, is adapted to remove a previously formed brick which has been ejected from the mold cavity and position the brick on a receiving surface forwardly of the mold cavity.

When the charger is in the return position adjacent the supply hopper, the aforementioned die means operate to compress the mix into a brick, and to eject the brick from the mold cavity.

The apparatus is usually so arranged that the mold cavity and the hopper extend vertically and the charger reciprocates in a horizontal plane. The die means include a lower die which acts as a bottom closure for the mold cavity, and an upper die reciprocable into and out of the cavity. The lower die is generally biased upwardly under a controlled spring pressure, whereas the upper die is operated by a power device, preferably through a toggle mechanism. The apparatus is usually driven from an external power source, such as an electric motor, and timing means are provided, preferably of a mechanical nature, so that the operation takes place in the desired predetermined sequence.

In the use of such apparatus, it has been found that, if the mix is not uniformly distributed throughout the mold cavity, the surface of the formed brick may vary. The reason for this is that the relatively coarse and fairly dry mix has only a very slight tendency to "flow" under the applied die pressure. If the mix is so distributed that the level thereof in the mold is uneven or is higher at the rear end than at the forward end, for example, it will be found that the surface of the pressed brick is smoother at the portions having the higher level of mix, such as at its rear portion, than in its forward portion, for example, as even the very heavy pressure exerted by the die means is insufficient to effect sufficient flow of the mix to assure a uniform distribution thereof.

Such non-uniform distribution of the mix is frequently caused by the charger during its return stroke in which the excess mix is removed from the upper surface of the mix in the mold cavity. With the large mesh mix, the scraping edge of the charger tends to roll lumps of the mix toward the rear edge of the mold, thereby causing the level of the mix in the mold to be rough or uneven, and generally higher at its rear end than at its forward end.

The present invention is directed to improved apparatus for assuring a uniform level of the mix throughout the extent of the mold cavity. For this purpose, a trough is mounted on a brick pressing machine of the described type, preferably adjacent the forward limit of movement of the charger. This trough has an adjustable gate which is arranged to be opened during the mold filling stroke of the charger by the formed brick removing pusher means of the latter. The trough is filled with grog, preferably relatively fine, such as 14 mesh for example.

A spreader, such as a hopper tapering to a narrow elongated bottom outlet, is movable in substantial synchronism with the charger. When the charger fills the mold with relatively coarse mix, during the forward or filling stroke of the charger, the spreader is aligned beneath the hopper, and the hopper gate is open a selected amount to discharge a predetermined quantity of fine grog into the spreader. During the return stroke of the charger, the separator distributes such fine grog over the upper surface of the mix in the mold cavity, and its lower edge levels off the fine grog, bringing the level of the mix to a substantially uniform height throughout the extent of the mold cavity and thus compensating for any irregularity in the level of the upper surface of the mix caused by scraping of the charger or by other factors.

The charger generally has associated therewith a device known as a "raising gate" which extends forwardly beyond the charger and is pivotally secured thereto at the rear end of the gate. In a preferred embodiment of the present invention, the spreader is mounted on the forward end of such gate. Additionally, the charger generally has a pusher, such as an angular bar or the like, secured to its forward end for engaging and removing the ejected previously formed brick. In the preferred embodiment, the trough gate is horizontally movable and spring biased to a closed position, and carries an adjustable abutment which is engaged by the pusher bar on the charger to open the gate, when the spreader is beneath the trough, an amount predetermined in accordance with the desired amount of fine grog to be spread over the surface of the mix in the mold cavity.

With the foregoing in mind, it is an object of the present invention to provide improved apparatus for the dry press manufacture of brick.

Another object is to provide such apparatus in which the level of the mix within the mold cavity is maintained at a uniform value throughout the extent of the mold.

These, and other objects, advantages, and novel features of the invention will be apparent from the following description and the accompanying drawings.

Figure 2:
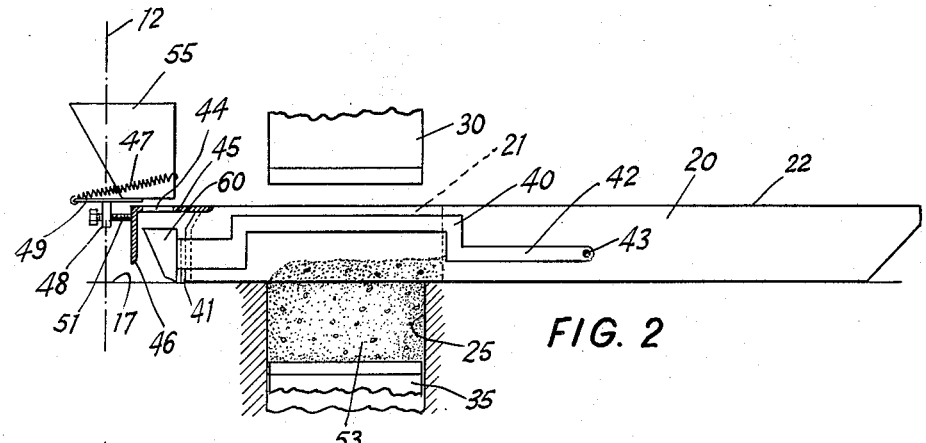
Figure 3:
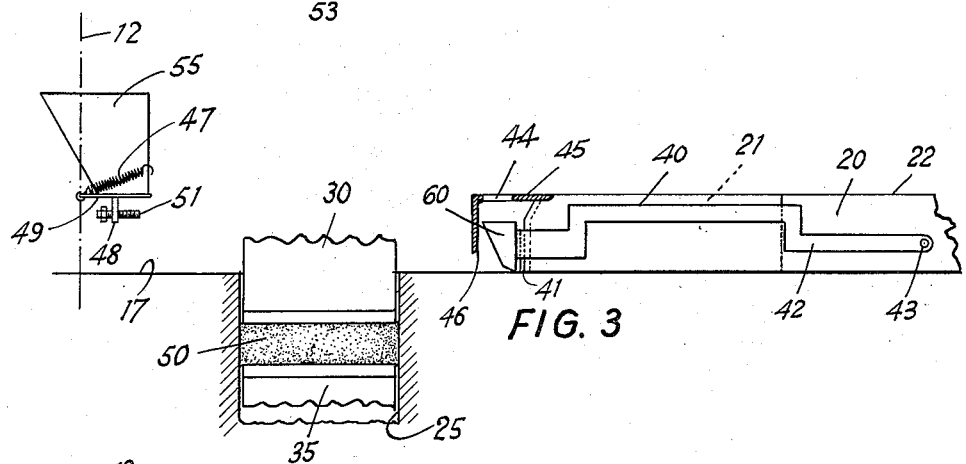
Figure 4:
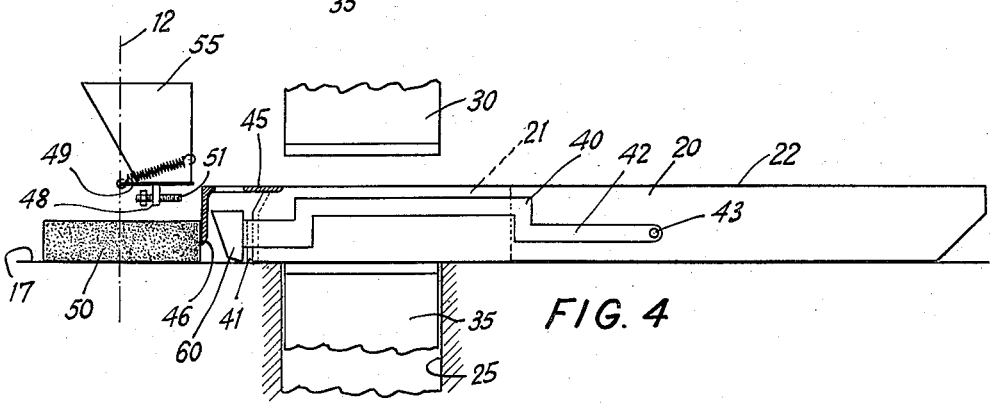

In the drawings:

Fig. 1 is a vertical sectional view through brick forming and pressing apparatus of the type to which the present invention is applicable; and Figs. 2, 3 and 4 are partial elevation and sectional views illustrating the invention improvement and its operation, non-related parts of the apparatus of Fig. 1 being omitted for the purpose of clarifying the illustration.

In order that the application of the invention to brick manufacturing apparatus will be readily understood, Fig. 1 illustrates the main elements of a well known type of machine for forming and pressing brick. The machine illustrated in Fig. 1 is known to the art as a "Boyd Brick Press." In this figure, the machine is illustrated without the invention improvements, in order to simplify the disclosure, and the improvements have been shown in Figs. 2, 3 and 4, with only the directly associated elements of the machine of Fig. 1, in order to afford a clearer understanding of the invention.

Referring to Fig. 1, the brick manufacturing apparatus 10 includes a supporting frame generally indicated at 11 on which is mounted a hopper 15 in back of an upright or die guiding portion 12 of frame 11. Hopper 15 is arranged to contain a supply of relatively coarse mesh mix for pressing into bricks, and acts as a reservoir which may be kept filled with mix by means of a suitable conduit or chute leading to a storage bin (not shown) on an overhead support, for example. Hopper 15 has an open bottom 16 which is vertically alignable with the mix receiving chamber 21 of a charger generally indicated at 20. Charger 20, in Fig. 1, is in an intermediate retracted position.

Charger 20 is arranged to reciprocate in a substantially horizontal plane so that chamber 21 is movable between a position vertically aligned with hopper 15 and a position vertically aligned with a mold cavity 25. In the first position, chamber 21 is charged with mix from hopper 15 and, as charger 20 moves towards mold cavity 25, a horizontal upper plate 22 on the charger seals the open bottom 16 of hopper 15.

The mold cavity 25 is aligned with the vertical support 12 which acts as supporting and guiding means for the upper die means 30. Cavity 25 may have removable liners 26 so that the shape of the cavity may be changed in accordance with the desired shape of the brick.

Associated with the cavity 25 is a lower die means 35 acting as a bottom closure for cavity 25.

Dies 30 and 35 are detachably secured to support blocks such as 31 and 36, whereby the dies may be changed and other dies substituted therefor when the shape of the mold cavity is changed. In the operation of the machine, the dies 30 and 35 compress the mix discharged into cavity 25 from chamber 21, after which lower die 35 moves upwardly to eject the formed brick. On the next forward stroke of charger 20, the forward edge of the latter, or a suitable pusher bar secured to the forward edge, pushes the formed brick forwardly onto a table 17 from which the formed brick may be removed to a suitable conveyor for further processing.

The operation of the dies 30 and 35, and of the charger 20, is effected in timed relation so that, when the dies are withdrawn, the charger fills the mold cavity and, as the charger withdraws to a position aligning chamber 21 with hopper 15, the dies compress the mix in the mold cavity. The dies then release, with lower die 35 moving upwardly to eject the formed brick.

As the operation of the well known apparatus shown in Fig. 1 is familiar to those skilled in the art, only a brief description of the operation will be necessary. The brick forming and pressing machine is driven, from a suitable electric motor, internal combustion engine, or other power source, which drives a pulley 13. Through suitable clutches and gearing, pulley 13 drives a pinion 14 which rotates a massive gear 18 in a clockwise direction. Gear 18 carries a crank pin 26 connected to the pivot 27 of a toggle, generally indicated at 33, by a beam 19. The upper arm 28 of the toggle is oscillatable on a pin 29 connected to the upper ends of sidearms 37. The sidearms are vertically reciprocable in frame portion 12 and their lower ends are connected to crosshead 38. An equalizing spring 39 is compressed by downward movement of sidearms 37.

Crosshead 39 has a recess in which is seated a spring 56 biasing upwardly block 36 to which is secured lower die 35. A saddle rod 57, attached to block 36, is reciprocable through crosshead 39, and its lower end carries a saddle 58 which is engageable by the inner ends of a dual lever 59 oscillatable on a pin 61 mounted in a bracket 62 attached to crosshead 38. The forked outer ends of lever 59 engage a pin 63 on a nut 64 which is vertically adjustable along a threaded shaft 66 operated by a hand wheel 34. These latter elements comprise a pressure adjusting mechanism which has a fulcrum on pin 63. A cammed lifting shoe 67 secured on the lower surface of beam 19 is cooperable with a lifting roller 68 mounted on frame 11.

In Fig. 1, the dies are shown substantially in their maximum pressure position, and the engagement of shoe 67 with roller 68 has lifted the side bars 37 and attached crosshead 38. Beam 19 is about to move outwardly to release the toggle 33. Due to the upward movement of crosshead 37, lever 59 has swung upwardly about pin 63, the relations involved being such that the inner ends of the lever have disengaged, and are substantially spaced from, saddle 58. The pressure of upper die 30 holds lower die 35 with its mounting block 36 against crosshead 38 and compressing spring 56.

As beam 19 moves outwardly to release the toggle mechanism, and thus withdraw upper die 30, the shoe 67 riding outwardly over roller 68 causes the outer end of beam 19 to move upwardly raising side arms 37 and crosshead 38 even more. This increases the spacing of the inner ends of lever 59 from saddle 58 so that, as the upper die 30 clears mold cavity 25 and moves further upwardly, spring 56 biases lower die 35 to move upwardly. The movement of lower die 35 continues until the pressed brick 50 is lifted level with table 17. Later, the action of bars 37 lowers crosshead 38 to engage the ends of lever 59 with saddle 58 to pull die 35 down, in conjunction with downward movement of crosshead 38, to provide a filling space in cavity 25.

Charger 20 is reciprocated horizontally by an arm 23 connected to the hopper by links 24. The reciprocating mechanism 23, 24 for the charger is coordinated with the die operating mechanism, in order to provide the aforementioned cycle of operation. When die 30 is clear of the mold and die 35 has ejected brick 50, charger 20, in its outward stroke, is adapted to move brick 50 onto table 17.

With the foregoing general description of the operation of a typical dry press brick manufacturing machine, the operation of the invention will be best understood by reference to Figs. 2, 3 and 4. In these latter figures, only the charger 20, mold cavity 25, die, and table 17 have been shown, as these are the elements of the machine to which the invention is applied, the other parts of the machine remaining unchanged.

As previously explained, the scraping action of the charger during its return stroke, as well as other factors, frequently result in an uneven top level of the relatively coarse mix in mold cavity 25, which has undesirable results in so far as uniform surface of the formed brick is concerned. To this end, the invention resides in apparatus for distributing fine grog over the upper surface of the mix during the return stroke of the charger so that there will be a uniform level of mix in the mold cavity.

Referring to Figs. 2, 3 and 4, the charger 20 is generally provided with a raising gate 40 which is used to pile mix where needed during the manufacture of special shape bricks. Gate 40 includes a forward cross bar 41 and a pair of side arms 42 which are pivotally connected, as at 43, to charger 20. Also, the forward end of charger 20 has secured thereto an angular cross bar 45, whose depending flange 46 acts as a pusher for removing the formed brick 50 to table 17 after the brick has been ejected from cavity 25 by lower die 35.

In accordance with the invention, a trough or hopper 55 is mounted on or adjacent upright frame portion 12 near the front face of machine 10, this front face being indicated by the dot and dash line 12. Trough 55 has a bottom opening which is controlled by a horizontally slidable gate 49 which is biased by a spring 47 to a hopper closing position. Gate 49 has a depending abutment 48 in which is adjustably mounted a stud or bolt 51 projecting rearwardly toward charger 20 and so positioned that it will be engaged by depending flange 46 of bar 45 when charger 20 is reaching the limit of its forward movement.

Mounted on cross bar 41 of gate 40 is a spreader 60, in the form of a small hopper or the like, having a relatively wide, open top and a transversely elongated, narrow slot in its bottom edge. Spreader 60 is arranged to receive material from trough 55 when gate 49 is open, and the bottom edge of the spreader rests on the supporting surface for charger 20 so that such edge scrapes along the surface. For purpose of providing entry of fine grog into spreader 60, the horizontal flange of cross bar 45 is provided with a suitable opening 44.

Fig. 2 shows charger 20 in its extreme forward position in which it has discharged a body of mix 53 into mold cavity 25, this mix having previously discharged into chamber 21 from hopper 15. As charger 20 nears its limit of forward movement, flange 46 of bar 45 strikes bolt or stud 51 opening gate 49 against the tension of spring 47. Trough 55 contains a supply of fine grog, for example of 14 mesh, or less. As gate 49 is opened, this fine grog flows from trough 55 through opening 44 of bar 45 into spreader 60. The amount of grog entering spreader 60 is controlled by the degree of opening of gate 49. This is adjustable by means of stud 51 to the degree of opening required in any particular case.

As charger 20 retracts toward hopper 15, the grog in spreader 60 is distributed over the upper surface of mix 53 in cavity 25, the relatively fine grog being "flowed" over the coarse mix, to obtain a uniform level of mix, by means of scraping action of the rear edge of the bottom discharge slot of spreader 60. When charger 20 has reached its retracted position, as shown in Fig. 3, dies 30 and 35 compress the mix in cavity 25 into the desired shape of the brick 50. Upper die 30 then moves upwardly under the action of toggle mechanism 33, and lower die 35 rises to eject brick 50, as described.

As the charger 20 then moves forwardly to refill cavity 25 with mix, pusher bar flange 46 engages brick 50 and moves the latter forwardly onto table 17. As the forward movement of charger 20 continues, flange 46 engages bolt 51 to open gate 55 to refill spreader 60 as previously described. This cycle is repeated each time the machine forms a brick. Of course, if a multiple cavity machine is used, the invention apparatus is provided in multiple and associated with each of the chargers.

Due to the uniform upper level of the mix in mold cavity 25, the formed brick has a uniform upper surface. The relatively fine grog, as distinguished from the relatively coarse mix, "flows" over the upper surface of the mix, under the scraping action of charger 20, to achieve the desired uniform upper level.

It will be understood that spreader 60 need not necessarily be mounted on charger 20, provided the spreader is moved inwardly to spread the fine grog after the charger 20 has withdrawn over the material in cavity 25. Also, gate 49 can be operated otherwise than by the charger 20 abutting bolt 51. For example, spreader 60 can be operated by suitable mechanism driven from gear 18, as can also be gate 49.

While a specific embodiment of the invention has been shown and described in some detail to illustrate the application of the invention principles, it will be understood that the invention may be otherwise embodied without departing from such principles.

I claim:

1. In brick manufacturing apparatus of the type including a hopper for containing mix, means forming a mold cavity for receiving mix and spaced from said hopper, die means operatively associated with the cavity to compress mix therein to form a brick and to eject the formed brick from the mold cavity, a charger having a mix receiving space and reciprocable between a rearward position in which it receives mix from said hopper and a forward position, and discharging mix into the mold cavity during advance toward such forward position, the mix receiving capacity of the charger being at least equal to the mold capacity before compression of the brick, said charger, in its mold cavity filling stroke, removing a formed brick ejected from the mold cavity by engaging the formed brick by pusher means mounted on the charger in forwardly spaced relation to the forward edge of the charger mix receiving space and, on its retraction toward such rearward position, removing excess mix from the surface of the mix filling the mold cavity; the combination comprising a trough mounted in advance of such forward position for containing a supply of fines; gate means controlling discharge of fines from said trough; spreader means supported by the charger between the charger mix receiving space and such pusher means and arranged to receive fines from said trough and to discharge said fines onto the surface of the mix in the mold cavity during such retraction of the charger; and abutment means on said gate means engageable by such pusher means to open said gate means when said spreader means is aligned with said trough.

2. In brick manufacturing apparatus of the type including a hopper for containing mix, means forming a mold cavity for receiving mix and spaced from said hopper, die means operatively associated with the cavity to compress mix therein to form a brick and to eject the formed brick from the mold cavity, a charger having a mix receiving space and reciprocable between a rearward position in which it receives mix from said hopper and a forward position, and discharging mix into the mold cavity during advance toward such forward position, the mix receiving capacity of the charger being at least equal to the mold capacity before compression of the brick, said charger, in its mold cavity filling stroke, removing a formed brick ejected from the mold cavity by engaging the forward brick by pusher means mounted on the charger in forwardly spaced relation to the forward edge of the charger mix receiving space and, on its retraction toward such rearward position, removing excess mix from the surface of the mix filling the mold cavity; the combination comprising a trough mounted in advance of the forward limit of movement of the charger for containing a supply of fines; gate means controlling discharge of fines from said trough; means biasing said gate means to a closed position; spreader means supported by the charger between the charger mix receiving space and such pusher means and arranged to receive fines from said trough and to discharge said fines onto the surface of the mix in the mold cavity during such retraction of the charger; and abutment means on said gate means engageable by such pusher means to open said gate means when said spreader means is aligned with said trough.

3. In brick manufacturing apparatus of the type including a hopper for containing mix, means forming a mold cavity for receiving mix and spaced from said hopper, die means operatively associated with the cavity to compress mix therein to form a brick and to eject the formed brick from the mold cavity, a charger having a mix receiving space and reciprocable between a rearward position in which it receives mix from said hopper and a forward position discharging mix into the mold cavity during advance toward such forward position, the mix receiving capacity of the charger being at least equal to the mold capacity before compression of the brick, said charger, in its mold cavity filling stroke, removing a formed brick ejected from the mold cavity by engaging the formed brick by pusher means mounted on the charger in forwardly spaced relation to the forward edge of the charger mix receiving space and, on its retraction toward such rearward position, removing excess mix from the surface of the mix filling the mold cavity; the combination comprising a trough mounted in advance of the forward limit of movement of the charger for containing a supply of fines; gate means controlling discharge of fines from said trough; means biasing said gate means to a closed position; spreader means supported by the charger between the charger mix receiving space and such pusher means and arranged to receive fines from said trough and to discharge said fines onto the surface of the mix in the mold cavity during such retraction of the charger; and abutment means on said gate means engageable by such pusher means to open said gate means when said spreader means is aligned with said trough, said abutment means being relatively adjustable whereby to vary the degree of opening of said gate means.

4. Apparatus for manufacturing pressed brick comprising, in combination, a hopper for containing mix; means forming a mold cavity for receiving mix and spaced from said hopper; die means operatively associated with the cavity to compress mix therein to form a brick and to eject the formed brick from the mold cavity; a charger reciprocable between a rearward position in which it receives mix from said hopper and a forward position, and discharging mix into the mold cavity during advance toward such forward position; said charger, in its mold cavity filling stroke, removing a formed brick ejected from the mold cavity and, on its retraction toward such rearward position, removing excess mix from the surface of the mix filling the mold cavity; a trough mounted adjacent the forward position of said charger for containing a supply of fines; gate means controlling discharge of fines from said trough; means biasing said gate to a closed position; an adjustable stop secured to said gate means; spreader means movable over the mold cavity with said charger and arranged to receive fines from said trough, when said charger is at such forward position, and to discharge said fines onto the surface of the mix in the mold cavity during such retraction of said charger; and abutment means on the forward end of said charger arranged to engage said stop to open said gate means when said spreader means is aligned with said trough; said adjustable stop controlling the degree of opening of said gate means.

5. In brick manufacturing apparatus of the type including a hopper for containing mix, means forming a mold cavity for receiving mix and spaced from said hopper, die means operatively associated with the cavity to compress mix therein to form a brick and to eject the formed brick from the mold cavity, a charger reciprocable between a rearward position in which it receives mix from said hopper and a forward position, and discharging mix into the mold cavity during advance toward such forward position, said charger, in its mold cavity filling stroke, removing a formed brick ejected from the mold cavity and, on its retraction toward such rearward position, removing excess mix from the surface of the mix filling the mold cavity; the combination comprising a trough mounted adjacent the forward position of the charger for containing a supply of fines; gate means controlling discharge of fines from said trough; means biasing said gate to a closed position; an adjustable stop secured to said gate means; spreader means movable over the mold cavity with said charger and arranged to receive fines from said trough, when said charger is at such forward position, and to dicharge said fines onto the surface of the mix in the mold cavity during such retraction of the charger; and abutment means on the forward end of the charger arranged to engage said stop to open said gate means when said spreader means is aligned with said trough; said adjustable stop controlling the degree of opening of said gate means.

6. Apparatus for manufacturing pressed brick comprising, in combination, a hopper for containing mix; means forming a mold cavity for receiving mix and spaced from said hopper; die means operatively associated with the cavity to compress mix therein to form a brick and to eject the formed brick from the mold cavity; a charger reciprocable between a rearward position in which it receives mix from said hopper and a forward position, and discharging mix into the mold cavity during advance toward such forward position; said charger, in its mold cavity filling stroke, removing a formed brick ejected from the mold cavity and, on its retraction toward such forward position, removing excess mix from the surface of the mix filling the mold cavity and having pusher means secured to its forward end to engage the ejected formed bricks; a trough mounted adjacent the forward position of said charger for containing a supply of fines; gate means controlling discharge of fines from said trough; means biasing said gate to a closed position; an adjustable stop secured to said gate means; and a spreader secured to the forward end of said charger and arranged to receive fines from said trough, when said charger is at such forward position, and to discharge said fines onto the surface of the mix in the mold cavity during such retraction of said charger; said pusher means being arranged to engage said stop to open said gate means when said spreader is aligned with said trough; said adjustable stop controlling the degree of opening of said gate means.

7. In brick manufacturing apparatus of the type including a hopper for containing mix, means forming a mold cavity for receiving mix and spaced from said hopper, die means operatively associated with the cavity to compress mix therein to form a brick and to eject the formed brick from the mold cavity, a charger reciprocable between a rearward position in which it receives mix from said hopper and a forward position, and discharging mix into the mold cavity during advance toward such forward position, said charger, in its mold cavity filling stroke, removing a formed brick ejected from the mold cavity and, on its retraction toward such rearward position, removing excess mix from the surface of the mix filling the mold cavity and having pusher means secured to its forward end to engage the ejected formed bricks; the combination comprising a trough mounted adjacent the forward position of said charger for containing a supply of fines; gate means controlling discharge of fines from said trough; means biasing said gate to a closed position; an adjustable stop secured to said gate means; and a spreader secured to the forward end of said charger and arranged to receive fines from said trough, when said charger is at such forward position, and to discharge said fines onto the surface of the mix in the mold cavity during such retraction of said charger; said pusher means being arranged to engage said stop to open said gate means when said spreader is aligned with said trough; said adjustable stop controlling the degree of opening of said gate means.

HEYWARD RIVERS.

References Cited in the file of this patent

UNITED STATES PATENTS

| Number | Name | Date |
|---|---|---|
| 1,599,084 | Gibson | Sept. 7, 1926 |
| 1,599,085 | Gibson | Sept. 7, 1926 |
| 1,796,203 | Jonkergouw et al. | Mar. 10, 1931 |
| 1,936,820 | Benner et al. | Nov. 28, 1933 |
| 2,208,054 | Reed | July 16, 1940 |
| 2,218,196 | Hagar | Oct. 15, 1940 |
| 2,296,453 | Saffert | Sept. 22, 1942 |
| 2,401,663 | Rembert | June 4, 1946 |